(12) United States Patent
Gillecriosd

(10) Patent No.: US 8,191,661 B2
(45) Date of Patent: Jun. 5, 2012

(54) THROTTLE-FREE TRANSMISSIONLESS HYBRID VEHICLE

(76) Inventor: Marsaili Gillecriosd, Monrovia, CA (US)

( * ) Notice: Subject to any disclaimer, the term of this patent is extended or adjusted under 35 U.S.C. 154(b) by 0 days.

(21) Appl. No.: 12/911,958

(22) Filed: Oct. 26, 2010

(65) Prior Publication Data

US 2011/0040435 A1 Feb. 17, 2011

Related U.S. Application Data

(63) Continuation of application No. 12/498,804, filed on Jul. 7, 2009, now Pat. No. 7,836,986.

(51) Int. Cl.
*B60W 10/00* (2006.01)

(52) U.S. Cl. ............ 180/65.265; 180/65.21; 180/65.285

(58) Field of Classification Search ................. 180/65.8, 180/65.6, 65.7, 65.225, 65.265, 65.275, 65.245, 180/65.25, 65.285, 65.21; 701/22, 54, 51, 701/52, 53; 477/2, 4, 5; 903/903, 904, 910
See application file for complete search history.

(56) References Cited

U.S. PATENT DOCUMENTS

| | | | |
|---|---|---|---|
| 3,623,568 A | 11/1971 | Mori | 180/65 A |
| 4,888,493 A | 12/1989 | Fluegel | 290/4 C |
| 5,635,805 A | 6/1997 | Ibaraki et al. | 318/139 |
| 5,778,326 A | 7/1998 | Moroto et al. | 701/22 |
| 5,832,396 A | 11/1998 | Moroto et al. | 701/22 |
| 6,054,844 A * | 4/2000 | Frank | 180/65.245 |
| 6,251,037 B1 | 6/2001 | Baumgaertner et al. | 180/65.235 |
| 6,380,640 B1 * | 4/2002 | Kanamori et al. | 903/903 |
| 6,726,592 B2 * | 4/2004 | Kotani | 477/4 |
| 6,825,575 B1 | 11/2004 | Edelson | 290/40 C |
| 7,024,299 B2 * | 4/2006 | Hubbard et al. | 701/54 |
| 7,062,916 B2 * | 6/2006 | Kamijo et al. | 60/706 |
| 7,105,938 B2 | 9/2006 | Edelson | 290/40 A |
| 7,137,919 B2 * | 11/2006 | Holmes | 475/5 |
| 7,150,254 B2 * | 12/2006 | Ichimoto et al. | 123/179.4 |
| 7,219,759 B2 | 5/2007 | Kitagawa et al. | 180/168 |
| 7,223,200 B2 | 5/2007 | Kojima et al. | 477/3 |
| 7,393,065 B2 | 7/2008 | Craig et al. | 180/370 |
| 7,469,758 B2 | 12/2008 | Iwanaka et al. | 180/65.1 |
| 7,559,864 B2 * | 7/2009 | Maeda et al. | 475/5 |
| 7,572,201 B2 * | 8/2009 | Supina et al. | 475/5 |
| 7,621,359 B2 | 11/2009 | Kano et al. | 180/65.21 |
| 7,694,763 B2 * | 4/2010 | Sugai et al. | 180/65.26 |
| 7,753,147 B2 | 7/2010 | Usoro | 180/65.27 |
| 7,836,986 B1 * | 11/2010 | Gillecriosd | 180/65.21 |
| 8,047,314 B2 * | 11/2011 | Oba et al. | 180/65.265 |
| 2008/0224478 A1 | 9/2008 | Tamor | 290/40 C |
| 2009/0171523 A1 | 7/2009 | Luo et al. | 701/22 |
| 2010/0100263 A1 * | 4/2010 | Aoki et al. | 701/22 |

FOREIGN PATENT DOCUMENTS

| | | | |
|---|---|---|---|
| JP | 2001112112 A | 4/2001 | |
| KR | 100466165 B1 | 1/2005 | |

OTHER PUBLICATIONS

Official Action Dated Aug. 2, 2010 Issued in Priority U.S. Appl. No. 12/498,804.
Official Action dated Sep. 9, 2010 Issued in Priority U.S. Appl. No. 12/498,804.

* cited by examiner

*Primary Examiner* — Hau Phan
(74) *Attorney, Agent, or Firm* — Robert M. Wallace

(57) ABSTRACT

In a high speed mode of operating and electric-gas hybrid car, the combustion engine is directly engaged to the wheels without a transmission and that vehicle speed is controlled without a throttle by electric generator loading of the engine.

6 Claims, 9 Drawing Sheets

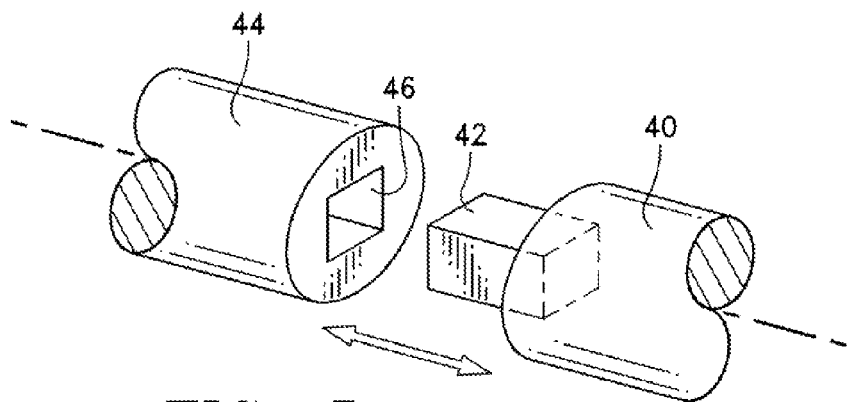

FIG. 5

| Operation Mode | Spline (MW) 18 | First Mtr/Gen 12 | Spline (ME) 16 | Engine 14 | Second Mtr/Gen 20 |
|---|---|---|---|---|---|
| Slow Speed, Low Batt | Dis-Engaged | Gen | Engaged | Running | Motor |
| Slow Speed, Full Batt | Dis-Engaged | Neutral | Dis-Engaged | Off | Motor |
| High Speed, Low Batt (Option 1) | Engaged | Gen & Load Con | Engaged | Running | Neutral |
| High Speed, Low Batt (Option 2) | Engaged | Neutral | Engaged | Running | Gen & Load Con |
| High Speed, Full Batt & Low Fuel (Opt 1) | Engaged | Motor | Dis-Engaged | Off | Neutral |
| High Speed, Full Batt & Low Fuel (Opt 2) | Dis-Engaged | Neutral | Dis-Engaged | Off | Motor |

FIG. 6

THROTTLE-FREE TRANSMISSIONLESS HYBRID VEHICLE

CROSS-REFERENCE TO RELATED APPLICATIONS

This application is a continuation of U.S. patent application Ser. No. 12/498,804 filed Jul. 7, 2009 now U.S. Pat. No. 7,836,986 entitled THROTTLE-FREE TRANSMISSIONLESS HYBRID VEHICLE by Marsaili Gillecriosd.

BACKGROUND

Hybrid vehicles of the type having both a combustion engine and a battery-powered electric motor provide greater fuel efficiency or gas mileage than conventional vehicles. Typically, the hybrid vehicle is a compact or light-weight passenger sedan, with the capability of re-charging the on-board battery from the rotation of the axle or wheel. In some models, the vehicle may also be charged from an electrical outlet, in the owner's garage for example. The performance of such a hybrid vehicle depends very highly on the vehicle weight. For optimum vehicle performance, the weight is minimized. However, certain components are required that are either costly or heavy, including the engine, transmission, electric motor/generator components, engine throttle/fuel injection controls. These components also greatly affect the weight and the cost of the hybrid vehicle.

Among various costly items, a hybrid vehicle requires a complex control system for managing the combustion engine throttle, the power delivered to the electric motors and the charging of the battery. The control system must coordinate the engine throttle, the electric motor drive power and the battery-charging current simultaneously in response to changing acceleration and deceleration commands from the driver. The need for the costly or heavy components, including the combustion engine, automatic transmission, electric motor(s), and a complex controller limits the degree to which the vehicle efficiency can be improved or its cost reduced. The controller governs the throttling of the engine, and simultaneously manages the power demand on the electric motors whenever needed to supplement torque if the engine capability is exceeded by the demands to the driver. The controller typically throttles the engine so as to optimize its efficiency, by maintaining its torque output above a predetermined fraction of maximum torque, for example. At the same time, the controller must determine the amount of supplementary power from the electric motors required to meet power demands. Such a controller is complex and is relatively costly.

SUMMARY

A hybrid vehicle comprises first and second sets of vehicle wheels, first and second motor-generators, a combustion engine and an electrical energy storage device for powering said motor-generators; a first spline coupler between said first motor generator and said engine and a second spline coupler between said first motor-generator and said first set of vehicle wheels, and a connection between said second motor-generator and one of said first and second sets of wheels. A first shaft speed encoder senses a shaft speed of one of said sets of wheels, a driver interface encoder senses a desired vehicle speed, and a comparator senses a difference between said wheel shaft speed and said vehicle speed. The hybrid vehicle further comprises a feedback loop controller for governing an amount of current generated by one of said first and second motor-generators in response to said difference so as to reduce the difference and match the vehicle speed to the desired speed.

BRIEF DESCRIPTION OF THE DRAWINGS

So that the manner in which the exemplary embodiments of the present invention are attained and can be understood in detail, a more particular description of the invention, briefly summarized above, may be had by reference to the embodiments thereof which are illustrated in the appended drawings. It is to be appreciated that certain well known processes are not discussed herein in order to not obscure the invention.

FIG. 5 depicts an implementation of an interlocking non-slip coupling or spline coupler employed in the embodiments of FIGS. 1-4.

FIG. 6 depicts a table depicting the state of each system component in the different operating modes of the power control system of any one of FIGS. 1-4.

Figure 1:
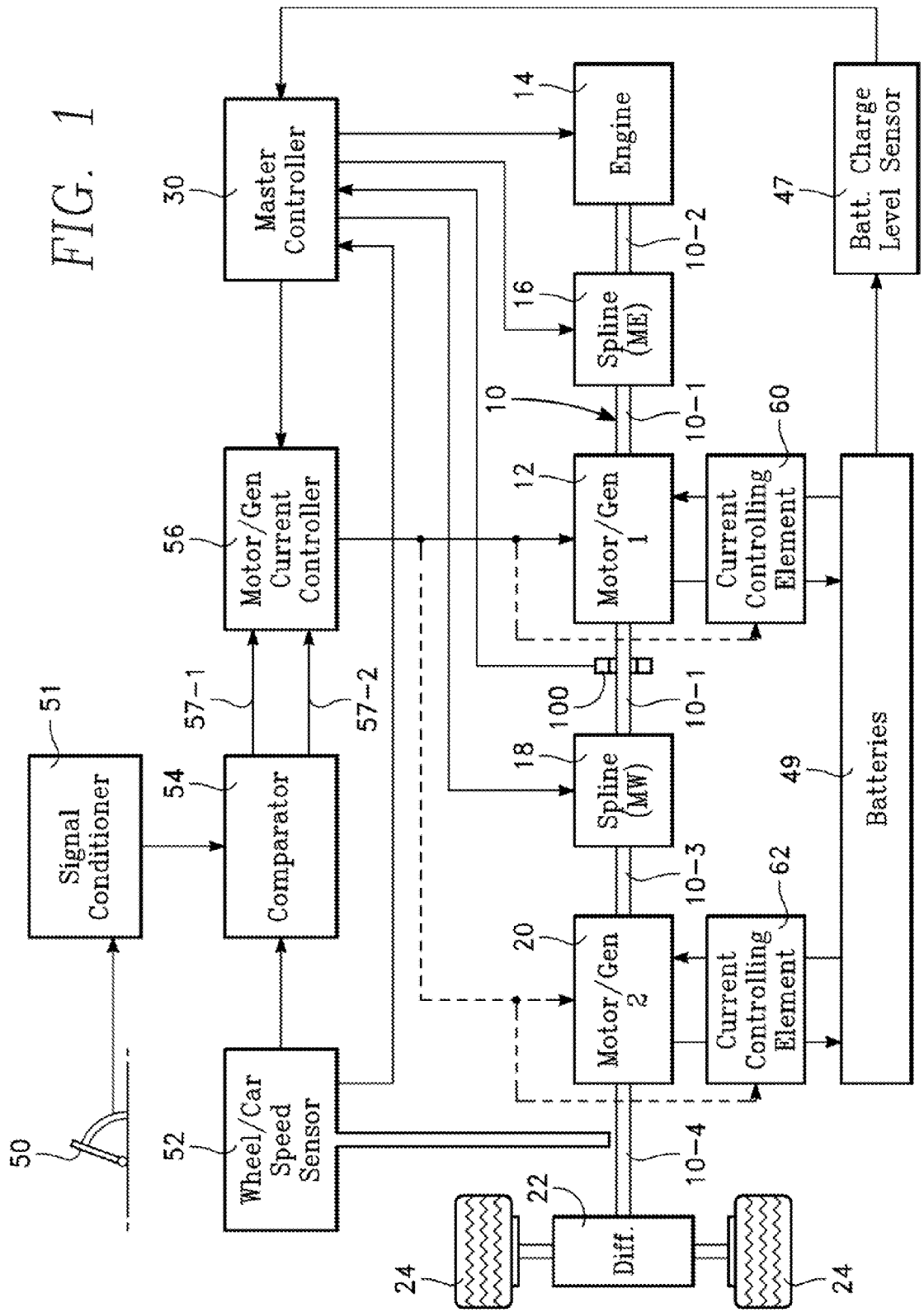
FIG. 1 is a schematic block diagram of a hybrid vehicle including a power control system in accordance with a first embodiment.

To facilitate understanding, identical reference numerals have been used, where possible, to designate identical elements that are common to the figures. It is contemplated that elements and features of one embodiment may be beneficially incorporated in other embodiments without further recitation. It is to be noted, however, that the appended drawings illustrate only exemplary embodiments of this invention and are therefore not to be considered limiting of its scope, for the invention may admit to other equally effective embodiments.

DETAILED DESCRIPTION

A hybrid vehicle is lightened and simplified by eliminating the need for any variable gear transmission and eliminating engine throttle or throttling. Elimination of the throttle enables the engine to operate in a highly efficient mode. I have discovered that in a high speed mode of operating, the combustion engine may be directly engaged to the wheels without a transmission and that vehicle speed may be controlled without a throttle by generator loading of the engine. Generator loading of the engine employs one of two electric motor-generators as a generator driven by the engine, with the torque loading of the engine by the generator being changed to change the vehicle speed in accordance with a desired speed. Generator loading of the engine is also employed after engine re-start to change the speed of the engine shaft to match the drive shaft speed prior to engagement of the engine and wheel shafts.

FIG. 1 depicts an embodiment in which the hybrid vehicle power components, including two electric motor-generators, a combustion engine and two spline couplers, are disposed along a common drive shaft axis. The shaft 10-1 of a first electric motor-generator 12 is coupled to the shaft 10-2 of a combustion engine 14 through a motor-engine spline coupler 16. The shaft 10-1 of the electric motor-generator 12 is also coupled through a motor-wheel spline coupler 18 to the shaft 10-3 of a second electric motor generator 20. The shaft 10-3 of the second electric motor generator 20 is connected to a final drive shaft 10-4. The final drive shaft 10-4 is coupled through a conventional differential 22 to a pair of drive wheels 24. Each spline coupler 16, 18 is a non-slip coupling and may be engaged and then disengaged under control of a master controller 30. The master controller 30 controls each of the system components, including the motor-generators 12, 20, the spline couplers 16, 18, for example. Each electric motor-generator 12, 20 is of a conventional type that can be controlled to generate electric current in one mode (generator mode), or to consume electric current to drive the shaft 10 in another mode (motor mode), or to do neither in another mode (neutral mode). In the generator mode, the motor-generator 12 converts the mechanical power or torque delivered by the engine 14 into an electric current that charges a rechargeable electrical energy storage device 49. The energy storage device 49 may be implemented as electric batteries, or a fuel cell or a capacitor, or similar devices, or a combination of some or all of the foregoing. Hereinafter, the energy storage device 49 will be referred to "batteries", with the understanding that the term as used herein refers generically any suitable form of a rechargeable electrical energy storage device such as a battery or fuel cell or capacitor or combination thereof. The motor-generator 20 converts power from the differential 22 into a charging current for the batteries 49 in a generator mode. In a motor mode, the motor-generator 20 converts electrical power from the batteries 49 into mechanical power to drive the output shaft 10-4. The master controller 30 controls the motor-generator controller 56, it controls engagement and disengagement of each individual spline coupler 16, 18, and it controls the state of each individual motor-generator 12, 20. Specifically, the master controller 30 can switch each motor-generator 12, 20 to any one of three states: (1) a "motor" state, in which the individual motor-generator operates as an electric motor, by converting electricity from the batteries to mechanical power; (2) a "generator" state, in which the individual motor-generator operates as an electric generator to convert rotation of its shaft into a battery-charging current; and (3) a neutral mode in which no electrical current flows through the motor-generator windings. The charge level of the batteries 49 is provided to the master controller 30 by a sensor 47.

In high speed travel during which the batteries are charged, the vehicle is propelled by the combustion engine 14. Vehicle speed is controlled by the position of an accelerator pedal 50, which is translated to a desired speed by a signal conditioner 51. Sensors 52 at the drive shaft 10-4 constantly sense the actual speed of the vehicle. A comparator 54 senses the difference between the actual speed from the sensors 52 and the desired speed from the signal conditioner 51. This difference is applied as a control correction signal to a motor-generator controller 56. FIG. 1 depicts the motor-generator controller 56 as separate from the master controller 30. In an alternative embodiment, the motor-generator controller 56 may be implemented as a part of the master controller 30. The motor-generator controller 56 responds to the control correction signal from the comparator 54 by either increasing or decreasing the amount of charging current produced by the motor-generator 12, depending upon whether the actual speed exceeds or is less than the desired speed. The comparator 54 determines whether the actual speed exceeds or is less than the desired speed and indicates this by the sign of the difference. For this purpose, the comparator 54 may provide two difference outputs, namely a magnitude output 57-1 and a sign bit 57-2. The controller 56 decrements or increments the charging current depending upon the sign bit, which is either 1 (positive) or 0 (negative). The change in charging current changes the torque load imposed on the engine 14 by the motor-generator 12. The change in torque load causes the engine speed (and the wheel speed measured by the sensors 52) to either increase or decrease (in inverse proportion to the change in torque load) in order to reduce the difference sensed by the comparator 54. The charging current is changed until the difference sensed by the comparator 54 is nearly zero, at which point the measured vehicle speed matches (or nearly matches) the desired speed indicated by the position of the accelerator pedal 50. The comparator 54, the sensors 52 and the motor-generator controller 56 constitute a feedback control loop. This feedback control loop may have a sampling rate at which the comparator 54 periodically samples the sensors 52, and the control correction signal is updated at the sampling rate. The sampling rate may be in the range of 10 to 100 Hertz, for example. In a preferred embodiment, the motor-generator 12 has a greater maximum torque capability than the combustion engine 14. As the amount of charging current generated by the electric motor-generator 12 is increased, the electric motor-generator 12 diverts more output torque from the engine 14, so that less torque is available to rotate the wheels 24, and the vehicle speed is reduced. In order to increase vehicle speed, the charging current is reduced, so that less torque is diverted by the electric motor-generator 12.

No throttling of the engine 14 is performed to change vehicle speed. The ability to control the charging current produced by the motor-generator 12 may be realized by providing a current-controlling element 60 in series with an electro-magnet or field winding of the motor-generator 12. The current-controlling element 60 may be of any suitable type involving electronic circuitry, and in particular may be implemented as either a pulse width modulator or pulse rate modulator, using conventional techniques. In the case of a pulse width modulator, the charging voltage or power from the motor-generator 12 is produced as a pulse train, and the controller 56 controls the charging current by changing the pulse width of the pulses. The current-controlling element 60 may be provided as internal circuitry of the motor-generator 12. If it is desired for the motor-generator 20 to provide the variable torque load on the engine 14 while charging the batteries 49 (instead of the motor-generator 12), a current-controlling element 62 is connected in series with an electro-magnet winding of the motor-generator 20 and controlled by the controller 56 so as to govern vehicle speed in the manner described above. The current-controlling element 62, like the current-controlling element 60, may be of any suitable type involving electronic circuitry, and in particular may be implemented as either a pulse width modulator or pulse rate modulator, using conventional techniques. In the case of a pulse width modulator, the charging voltage or power from the motor-generator 20 is produced as a pulse train, and the controller 56 controls the charging current by changing the pulse width of the pulses. The current-controlling element 62 may be provided as internal circuitry of the motor-generator 20.

In general, each current-controlling element 60, 62 may be used to control current generated by the respective motor-generator 12, 20 while operating in "generator" mode, and may be used to control current flow from the batteries 49 to the respective motor-generator 12, 20 while operating in "motor" mode.

Figure 2:
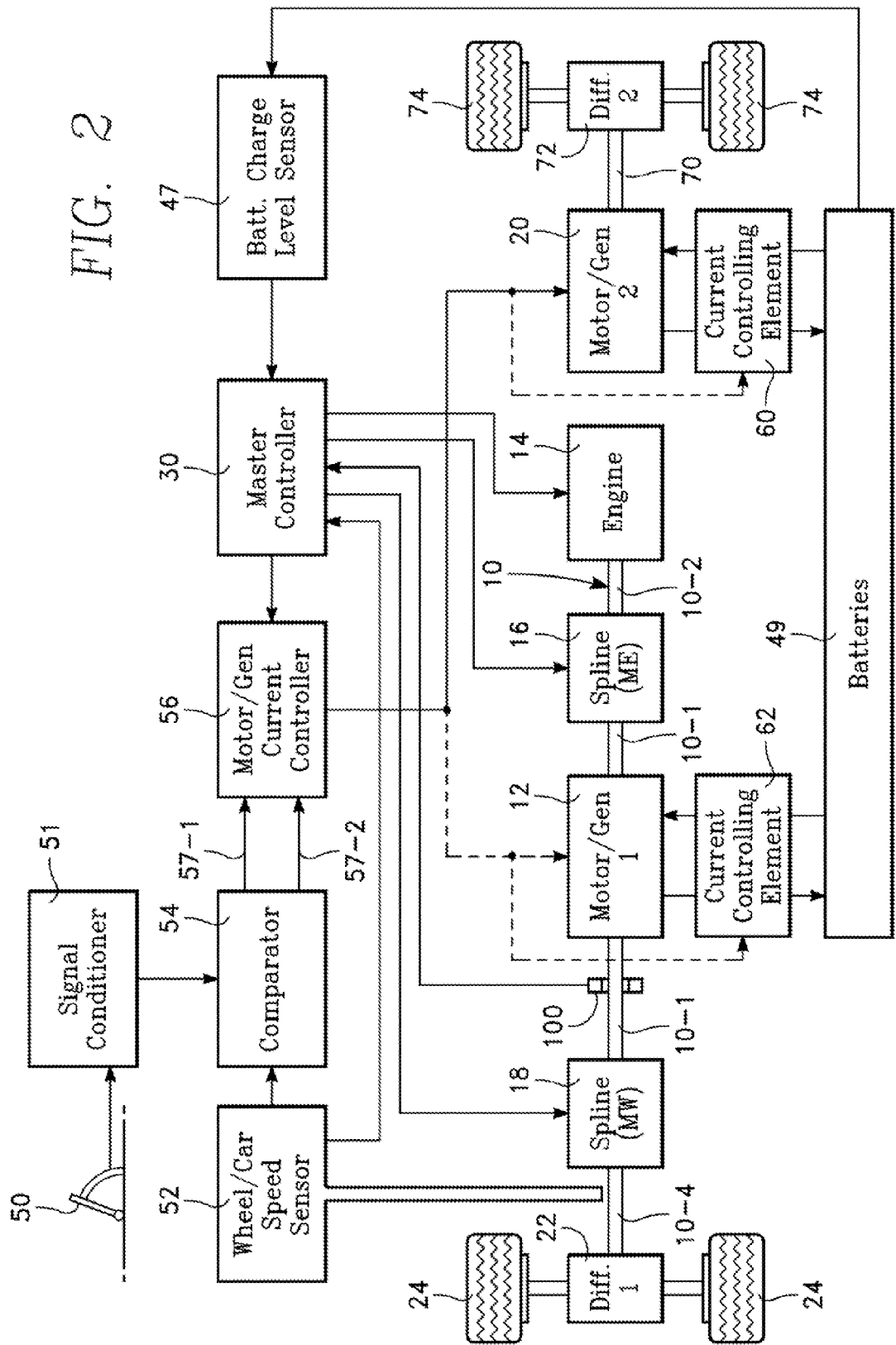
FIG. 2 is a schematic block diagram of a hybrid vehicle including a power control system in accordance with a second embodiment.

FIG. 2 depicts a modification of the embodiment of FIG. 1 in which the second motor-generator 20 is connected to the drive shaft 70 of a second differential 72 driving a second pair of wheels 74. The first differential 22 is connected to the first motor generator 12 and to the spines 16, 18, but not to the second motor generator 20. The system components described above with reference to FIG. 1 are present in the embodiment of FIG. 2 and operate in the same manner.

Figure 3:
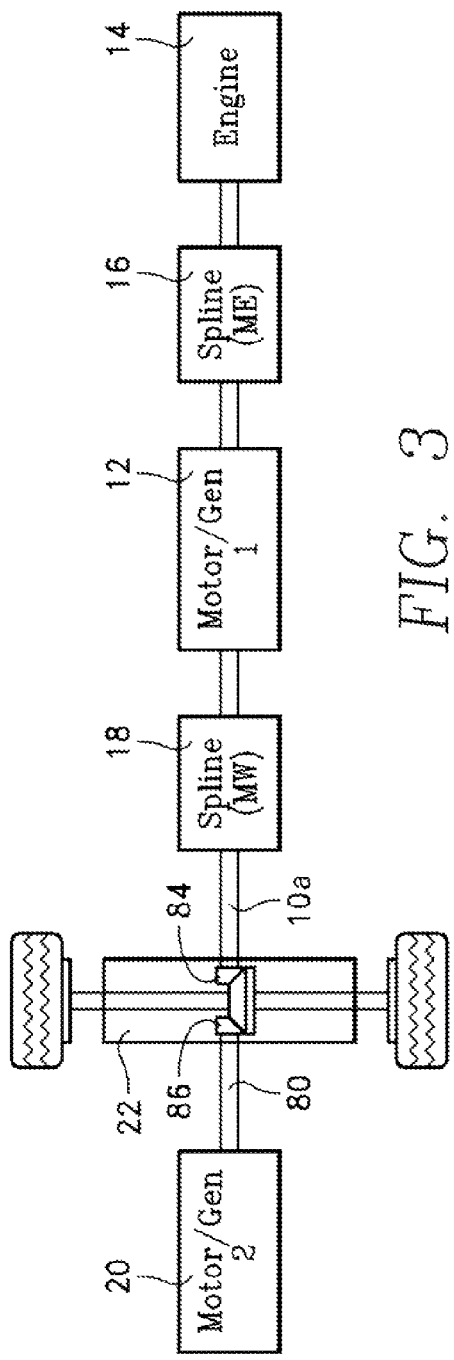
FIG. 3 is a schematic block diagram of a hybrid vehicle including a power control system in accordance with a third embodiment.

FIG. 3 depicts a modification of the embodiment of FIG. 1, in which the differential 22 is associated with a reduction gear 84, 86, and there are two shafts 10a and 80 driving the reduction gear 84, 86. The first motor-generator 12 and the two spline couplers 16, 18 are connected the one shaft 10a, while the second motor generator is connected to the other shaft 80. The system components described above with reference to FIG. 1 are present in the embodiment of FIG. 3 and operate in the same manner.

Figure 4:
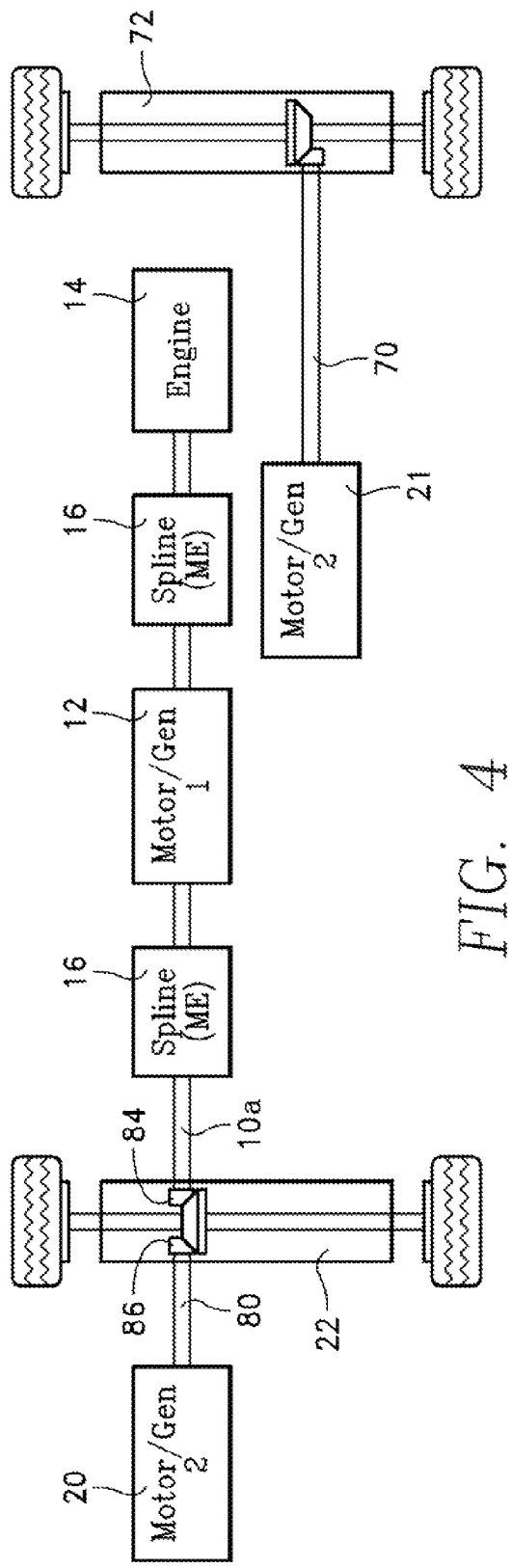
FIG. 4 is a schematic block diagram of a hybrid vehicle including a power control system in accordance with a fourth embodiment.

FIG. 4 depicts and embodiment having three (or more) motor-generators 12, 20 and 21, the motor-generator 21 being coupled to the rear wheels. Increasing the number of motor-generators enhances the ability of the on-board controller to maximize available torque under extremely high load conditions (acceleration or hill climbing) by exploiting a larger number of motor-generators to propel the vehicle together. In this way, a vehicle of superior performance can be realized without requiring the combustion engine 14 to be enlarged and without requiring any transmission.

One tutorial example of a spline coupler, corresponding to the spline coupler 16 or 18, is depicted in FIG. 5, and consists a keyed shaft 40 having a shaped key 42 on one end and a receptacle shaft 44 coaxial with the keyed shaft 40 and having an opening 46 into which the shaped key fits tightly whenever the two shafts 40, 44 are moved together.

FIG. 6 tabulates the different operating modes of the system and the states of the individual system components in each operating mode. The first operating mode listed in FIG. 6 is the "slow speed low battery" operating mode. In this mode, the motor-wheel spline coupler 18 is disengaged to decouple the engine 14 and first motor generator 12 from the drive shaft 10-4, while the motor-engine spline coupler 16 is engaged. The engine 14 is running and the first motor-generator 12 is in "charging" mode to charge the batteries 49. The second motor-generator 20 is in "motor" mode and rotates the drive shaft 10-4 using electricity directly from the motor-generator 12. The mechanical power delivered by the second motor-generator 20 is governed by the controller 56 through the current-controlling element 62 in accordance with the position of the accelerator pedal 50.

A second operating mode listed in FIG. 6 is the "slow speed full battery" mode. In this mode, the motor-engine spline coupler 16 and the motor-wheel spline coupler 18 are disengaged, so that only the second motor-generator 20 is connected to the differential 22. The second motor generator 20 drives the wheel 24 by discharging the batteries 49. The engine 14 is off and the first motor-generator 12 is mechanically isolated and may be idle or neutral. Optionally, in this operating mode, the first motor-generator 12 may supplement the driving power of the second motor-generator 20 whenever a sudden burst of power is desired. For this purpose, although not indicated in FIG. 6, the motor-wheel spline coupler 16 may be engaged and the first motor-generator 12 may operate in its "motor" mode by drawing current from the batteries.

A third operating mode listed in FIG. 6 is one version of a "high speed low battery" mode. In this version, both spline couplers 16, 18 are engaged, the engine 14 is running and the first motor-generator 12 operates in its "generator" mode, while the second motor-generator 20 may be in a neutral mode in which the second motor-generator 20 neither generates electrical current nor produces mechanical power unless called upon under a demand for high acceleration or torque. The feedback control loop (including the sensors 52, comparator 54 and controller 56) is in exclusive control of vehicle speed and governs vehicle speed by varying the charging current generated by the first motor-generator 12. No throttling of the engine 14 is provided and is not needed to control the vehicle speed.

A fourth operating mode listed in FIG. 6 is another version of a "high speed low battery" mode. In this version, the roles of the two motor-generators 12, are reversed, so that the first motor-generator is in a neutral mode while the second motor-generator 20 is in its generator mode. The feedback control loop (the sensors 52, the comparator 54, the controller 56) governs vehicle speed by varying the charging current generated by the second motor-generator 20 using the current-controlling element 62.

A fifth operating mode listed in FIG. 6 is one version of a "full battery low fuel" mode. In this version, the motor-wheel spline coupler 18 is engaged to enable the first motor-generator 12 to drive the differential 22 by drawing current from the batteries 49. The motor-engine spline coupler 16 is disengaged to permit the engine to be off.

A sixth operating mode listed in FIG. 6 is another version of a "full battery low fuel" mode. In this version, the roles of the first and second motor-generators 12, 20 are reversed, so that the second motor-generator 20 propels the vehicle, while the first motor-generator 12 is in its neutral mode.

Figure 7:
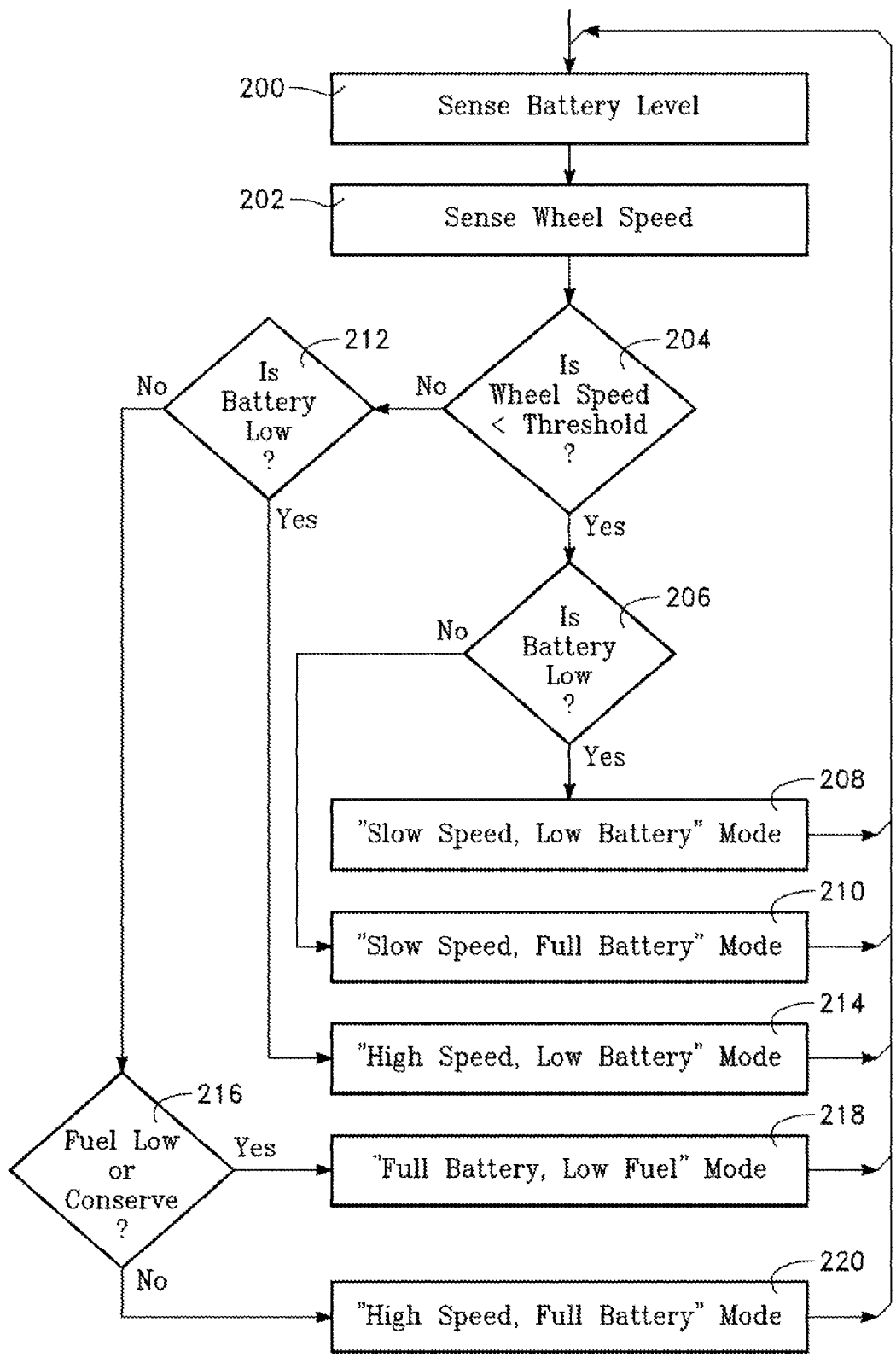
FIG. 7 is a block flow diagram illustrating the operation of a controller that determines the operating mode of the system of any one of FIGS. 1-4.

The state of each of the system components (the spline couplers 16, 18, the motor generators 12, 20 and the engine 14) is controlled in accordance with FIG. 6 by the master controller 30. FIG. 7 is a block flow diagram depicting how the master controller 30 performs such control, in accordance with an embodiment. The master controller 30 periodically senses the amount of electrical charge stored in the batteries 49 (block 200 of FIG. 7) and senses the vehicle speed through the sensors 52 (block 202 of FIG. 7). The controller 30 then determines whether the vehicle speed is below a threshold at which the engine 14 runs at a predetermined fraction (e.g., 30%) of its maximum torque (block 204 of FIG. 7). If so ("YES" branch of block 204), the controller determines (block 206 of FIG. 7) whether the stored battery charge is below a predetermined threshold. If so ("YES" branch of block 206), the master controller 30 changes the states of the spline couplers 16, 18, the motor-generators 21, 20 and the engine to conform with the "slow speed low battery" mode of FIG. 6 (block 208 of FIG. 7). Specifically, the controller 30 disengages the motor-wheel spline coupler 18, engages the motor-engine spline coupler 16, starts the engine 14, and places the first motor-generator 12 into its "generator" mode and the second motor-generator 20 into its "motor" mode.

Returning to the determination made in block 206, if it is found that the battery charge is not below the predetermined threshold ("NO" branch of block 206), then the master controller 30 changes the states of the spline couplers 16, 18, the motor-generators 12, 20 and the engine 14 to conform with the "slow speed full battery" mode of FIG. 6 (block 210). Specifically, the controller 30 disengages both spline couplers 16, 18, puts the first motor-generator 12 into neutral mode, turns off the engine 14 and puts the second motor-generator 20 into motor mode. In this mode, the second motor-generator 20 drives the output shaft 10-4 by consuming electric current from the batteries 49.

Returning to the determination made in block 204, if the wheel speed is not below the predetermined velocity threshold ("NO" branch of block 204), then a determination is made of whether the battery charge is below the predetermined charge threshold (block 212). If so ("YES" branch of block 212), the master controller 30 changes the states of the spline couplers 16, 18, the motor-generators 12, 20 and the engine 14 to conform with the "high speed low battery" mode of FIG. 6. Specifically, the master controller causes both spline couplers 16, 18 to be engaged, starts the engine, and puts at least one of the motor-generators 12 or 20 into its "generator" mode so as to draw torque from the engine 14 to charge the batteries 49 (block 214). This enables the feedback control loop (the sensors 52, the comparator 54 and the motor-generator current controller 56) to govern vehicle speed by varying the motor-generator charging current, in the manner described above.

Returning to the determination made in block 212, if it is found that the batteries are not low ("NO" branch of block 212), then the master controller 30 determines whether the fuel supply is low or below a predetermined fuel threshold (block 216). If the fuel is low ("YES" branch of block 216), then the master controller 30 changes the states of the spline couplers 16, 18, the motor-generators 12, 20 and the engine 14 to conform with the "full battery low fuel" mode of FIG. 6 (block 218). Specifically, the controller 30 disengages the spline coupler 16 and engages the spline coupler 18, puts the first motor-generator 12 into neutral mode and puts the second motor-generator 20 into motor mode. Otherwise ("NO" branch of block 216), the master controller 30 configures the system for running at high speed with full batteries by propelling the vehicle from either one (or both) of the two motor-generators using battery current (block 220).

Figure 8A:
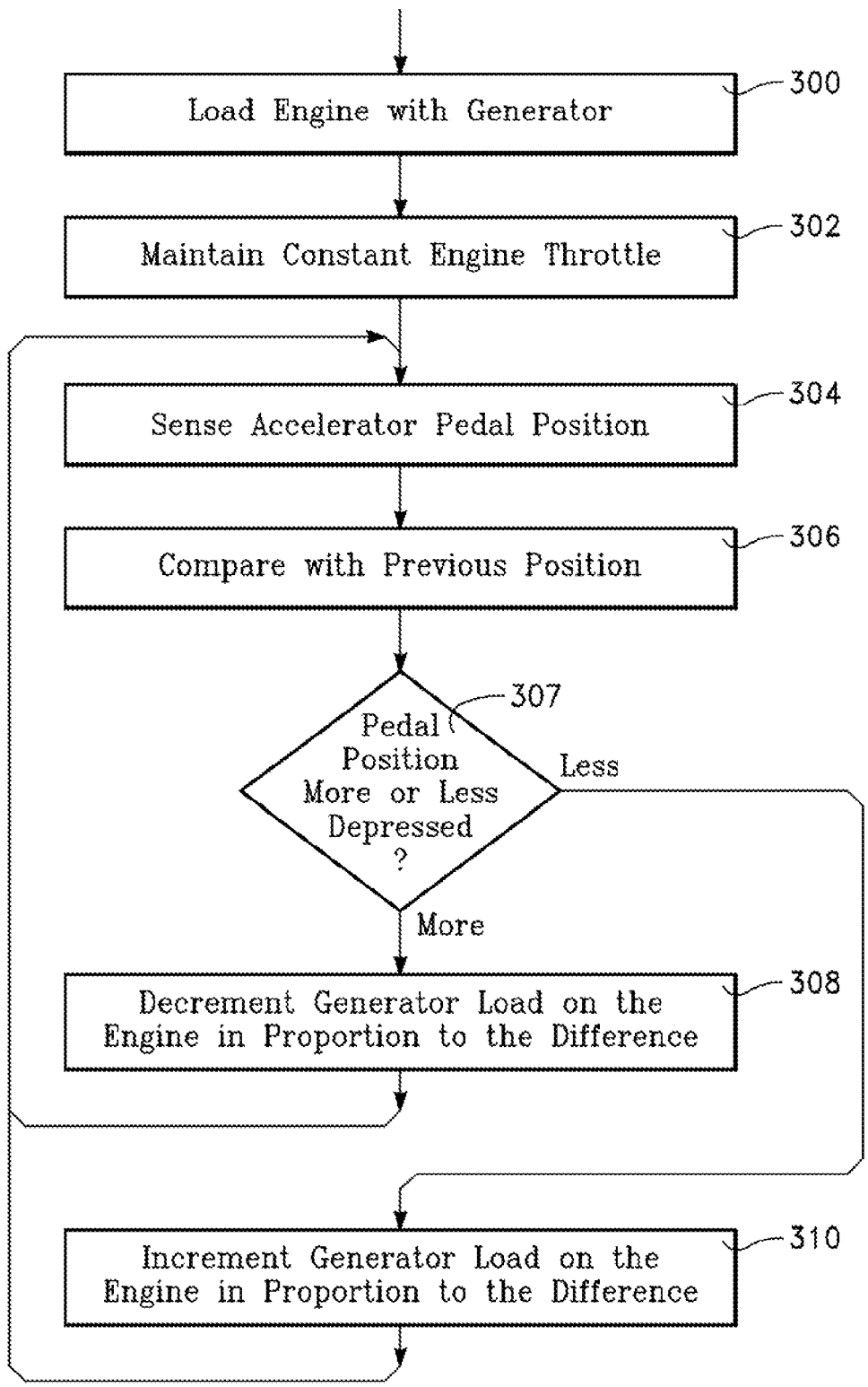
FIG. 8A is a block flow diagram depicting the operation of a "high speed low battery" mode in accordance with one mode.

FIG. 8A is a block flow diagram depicting the operation of the "high speed low battery" mode of block 214 of FIG. 7 in accordance with a first embodiment of this mode. In this mode, the first electric motor generator 12 imposes a torque load on the engine 14 (block 300 of FIG. 8A). For this purpose, both spline couplers 16, 18 are engaged and the motor-generator 12 operates in its "generator" mode in which it converts mechanical power from the engine 14 into electrical power for charging the batteries 49, as described above. The second motor-generator 20 may be neutral, except when called upon under a high torque demand. In an alternative embodiment, the roles of the two motor-generators 12, 20 are reversed, so that the first motor-generator 12 is neutral while the second motor-generator 20 operates in motor mode to provide a torque load on the engine 14, under control of the feedback control loop 52, 54, 56 operating in the manner described above. No throttle is required and no throttling of the combustion engine 14 is performed so that the engine 14 is operated in effect without a throttle (block 302). The comparator 54 samples the present position of the accelerator pedal operated by the driver (block 304) and compares the pedal position with the position sensed during the previous sampling (block 306) to determine whether the pedal position is more depressed or less depressed since the previous sample (block 307). If the latest pedal position is more depressed, the motor-generator controller 56 decrements the charging current that the motor-generator 12 is allowed to produce (block 308), causing the engine speed to increase. The amount by which the current is decremented may be proportional to the magnitude of the difference sensed by the comparator 54. If the present pedal position is less depressed than the previous one, then the motor-generator controller 56 increments the charging current that the motor-generator 12 is allowed to produce (block 310), thereby causing the engine speed to slow. The amount by which the current is incremented may be proportional to the magnitude of the difference sensed by the comparator 54. The controller 30 then returns to block 304 to complete a control cycle consisting of the blocks 304, 306, 308 and 310. This cycle is repeated at a rate determined by the controller.

Figure 8B:
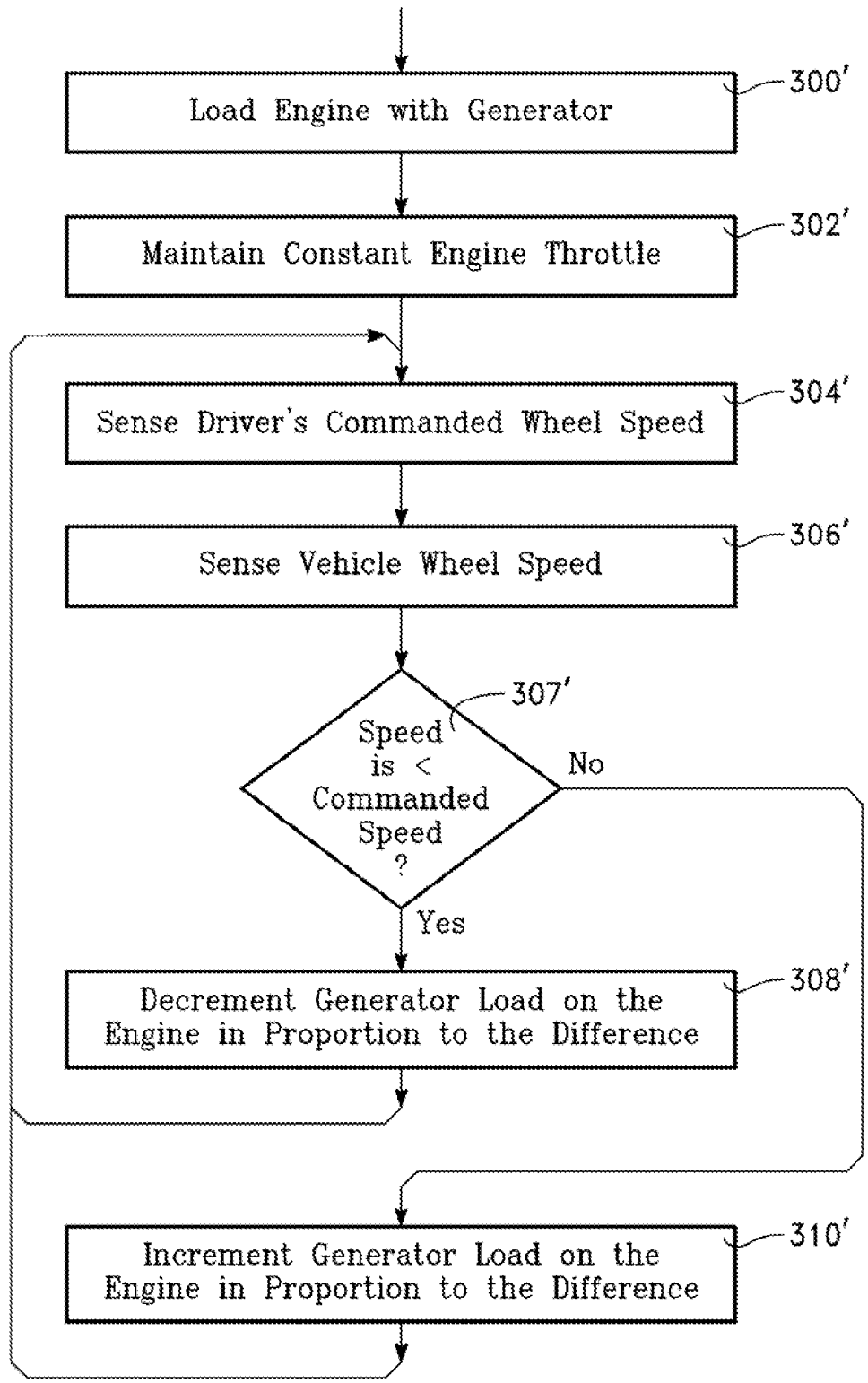
FIG. 8B is a block flow diagram depicting the operation of a "high speed low battery" mode in accordance with another mode.

FIG. 8B is a block flow diagram depicting the operation of the "high speed low battery" mode of block 214 of FIG. 7 in accordance with a second embodiment of this mode. In this mode, the first electric motor generator 12 imposes a torque load on the engine 14 (block 300' of FIG. 8). For this purpose, both spline couplers 16, 18 are engaged and the motor-generator 12 operates in its "generator" mode in which it converts mechanical power from the engine 14 into electrical power for charging the batteries 49, as described above. The second motor-generator 20 may be neutral.

In an alternative embodiment, the roles of the two motor-generators 12, 20 are reversed, so that the first motor-generator 12 is neutral while the second motor-generator 20 operates in motor mode to provide a torque load on the engine 14, under control of the feedback control loop 52, 54, 56 operating in the manner described above. No throttle is required and no throttling of the combustion engine 14 is performed so that the engine 14 is operated in effect without a throttle (block 302'). The comparator 54 receives the vehicle velocity desired by the driver (block 304') and receives the instantaneous actual vehicle velocity from the sensors 52 (block 306') to perform a comparison (block 307'). If the vehicle speed is less than the desired speed, the motor-generator controller 56 decrements the charging current that the motor-generator 12 is allowed to produce (block 308').

The amount by which the current is decremented may be proportional to the magnitude of the difference sensed by the comparator 54. If the vehicle speed is greater than the desired speed, the motor-generator controller 56 increments the charging current that the motor-generator 12 is allowed to produce (block 310'). The amount by which the current is incremented may be proportional to the magnitude of the difference sensed by the comparator 54. The controller 30 then returns to block 304' to complete a control cycle consisting of the blocks 304', 306', 308' and 310'. This cycle is repeated at a rate determined by the rate at which the sensors 52 provide updated measurements of vehicle speed.

In yet another embodiment, the generator loading of the engine 14 is determined in direct proportion to the position of the accelerator pedal 50. Thus, under deceleration, the motor-generator 12 (and/or the motor-generator 20) is operated so as to impose a greater generator load on the engine 14 (to slow it down) as the accelerator pedal 50 is less depressed (as the driver begins to let up on the accelerator pedal 50). Under acceleration, as the accelerator pedal is depressed more, the generator loading of the engine 14 is decreased (to enable it to speed up). As the pedal 50 is further depressed, the battery charging current is eventually decreased to zero (no generator loading). At this point, the engine 14 is producing its maximum torque and requires assistance from the motor-generator 12 for any further increase in speed. Therefore, at this point, the motor-generator 12 is switched from its "generator" mode to its "motor" mode, in which it provides more torque for the vehicle, the added power being determined by the position of the accelerator pedal 50, which in turn determines the current drawn by the motor-generator 12 from the batteries 49. As the accelerator pedal 50 is depressed even further, greater torque is attained by running both motor-generators 12 and 20 in the "motor" mode so that they both provide torque. The controller permits the motor-generators 12, 20 to draw increasingly greater current from the batteries 49 as the accelerator pedal continues to be further depressed. At maximum pedal depression ("floored"), both motor-generators draw the maximum amount of current from the batteries. Performance can be further enhanced by providing more on-board motor-generators to draw upon (without increasing engine size). Performance may also be enhanced by including, in the energy storage device 49, a capacitor or similar device capable of providing a greater current.

Figure 8C:
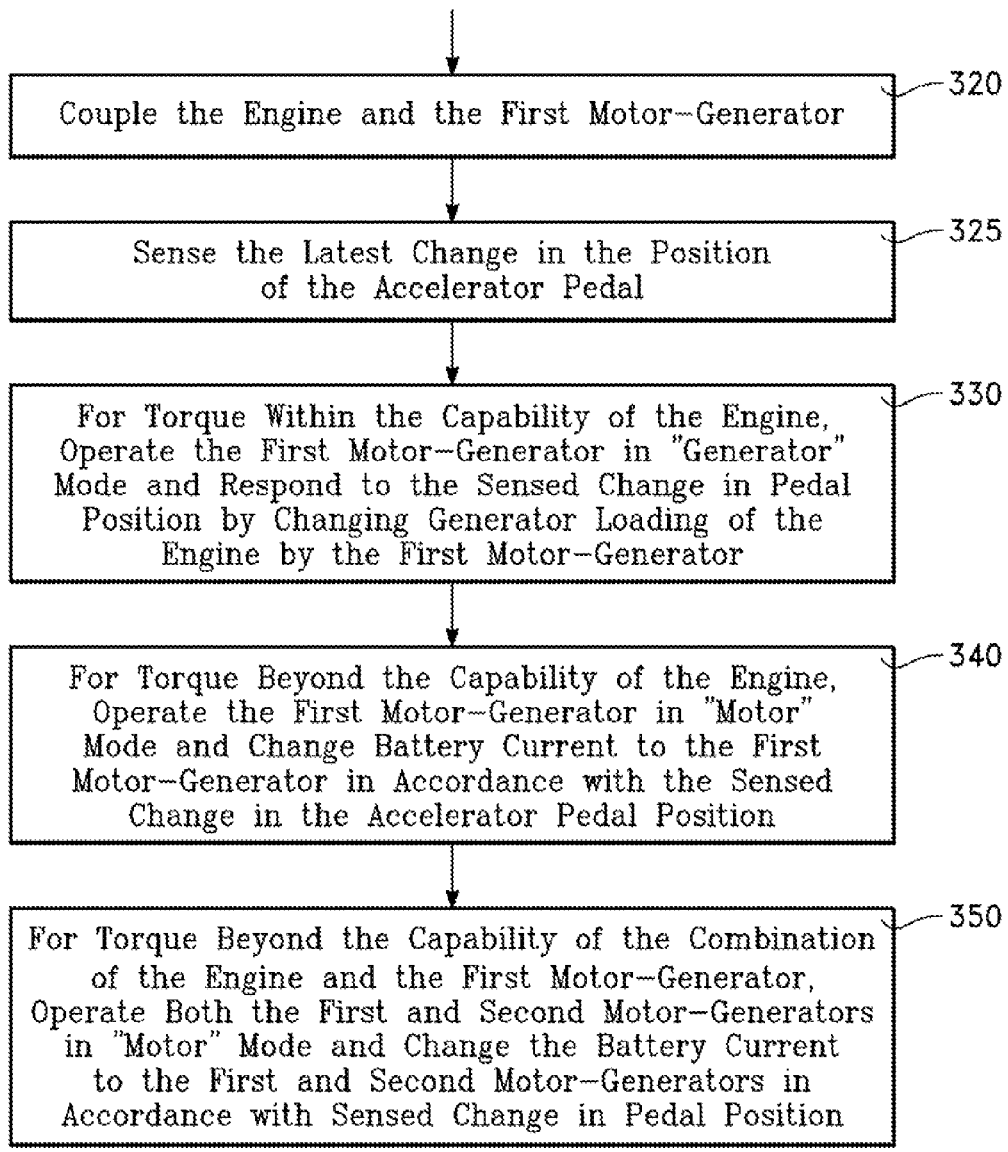
FIG. 8C is a block flow diagram depicting operation in accordance with a further mode.

Aspects of this latter embodiment are depicted in FIG. 8C. First, the engine 14 and the motor-generator 12 are coupled together by the spline 16, while the other motor-generator 20 is neutral/idle (block 320 of FIG. 8C). The comparator 54 senses (samples) the latest change in the position of the accelerator pedal 50 (block 325). This sampling is performed repetitively at a rate determined by the controller 56 or the controller 30. If the change in pedal position indicates a demand for torque within the capability of the engine 14, the motor-generator 12 is operated in "generator" mode (block 330). In this mode, the controller 56 responds to the sensed change in pedal position by changing generator loading of the engine 14 by the motor-generator 12 (by increasing or decreasing the charging current to the batteries 49 from the motor-generator 12). Such changes, in one embodiment, may be proportional to the change in pedal position, and may be an increase or decrease in current, depending upon the direction of the pedal position change. Otherwise, if the demand for torque is beyond the capability of the engine 14 (block 340), then the motor-generator 12 is operated in "motor" mode, drawing current from the batteries 49. In this mode, the battery current to the motor-generator 12 is changed in accordance with the sensed change in pedal position. In one embodiment, this change may be proportional to the change in pedal position, and may be an increase or decrease in current, depending upon the direction of the pedal position change. If the torque demand is even greater, beyond the capability of the combination of the engine 14 and the motor-generator 12 (block 350), the motor-generator 20 (which coupled to the wheels) is activated, and both of the motor-generators 12 and 20 are operated simultaneously in "motor" mode. In this mode, the battery current to the motor-generators 12 and 20 is changed in accordance with sensed change in pedal position. This change may be proportional to the pedal position, and may be an increase or decrease in current, depending upon the direction of the pedal position change. The system can revert to any of the three modes (of blocks 330, 340 and 350), depending upon the current torque demand. The master controller 30 or the controller 56 may determine the torque demand simply by noting the change in position of the pedal 50.

The sensing step of block 325 is performed repetitively at a predetermined rate. Each time this step is performed, the system may enter into any one of the modes of blocks 330, 340 and 350, so that a smooth transition between these modes is realized as the driver depresses and releases the accelerator pedal 50 while the vehicle is operated in the high speed low battery mode of block 214 of FIG. 7.

As described previously herein, in a high speed mode in which the combustion engine 14 directly drives the differential 22, the system regulates vehicle speed without throttling the combustion engine 14 by changing the load imposed on the engine 14 by the motor-generator 12 operating as a generator to charge the batteries 49. This may be referred to as generator-loading of the engine. Generator-loading of the engine is also employed during engine restart to control engine shaft speed without requiring any throttling of the engine. The motor-generator 12 is first employed in "motor" mode as a starter motor to re-start the engine 14 using electrical power from the batteries, while both the engine 14 and the motor-generator 12 are decoupled from the differential 22 by disengagement of the motor-wheel spline coupler 18. As soon as the engine has re-started, the motor-generator 12 is changed to "generator" mode to impose a torque load on the engine 14. The master controller 30 causes the motor-generator controller 56 to change the charging current of the motor-generator 12 so as to adjust the shaft speed of the engine 14. A shaft speed sensor 100 at the output shaft 10-1 of the motor-generator 12 (or at the output shaft 10-2 of the engine 14) furnishes the master controller 30 with instantaneous measurements of engine shaft speed. The master controller also senses the speed of the output drive shaft 10-4 by the sensor 52 referred to previously herein. As soon as the engine shaft speed matches the speed of the drive shaft 10-4, the master controller 30 causes the motor-wheel spline coupler 18 to engage, so that the engine 14 then powers the vehicle. This engine restarting process is described in detail below.

Figure 9:
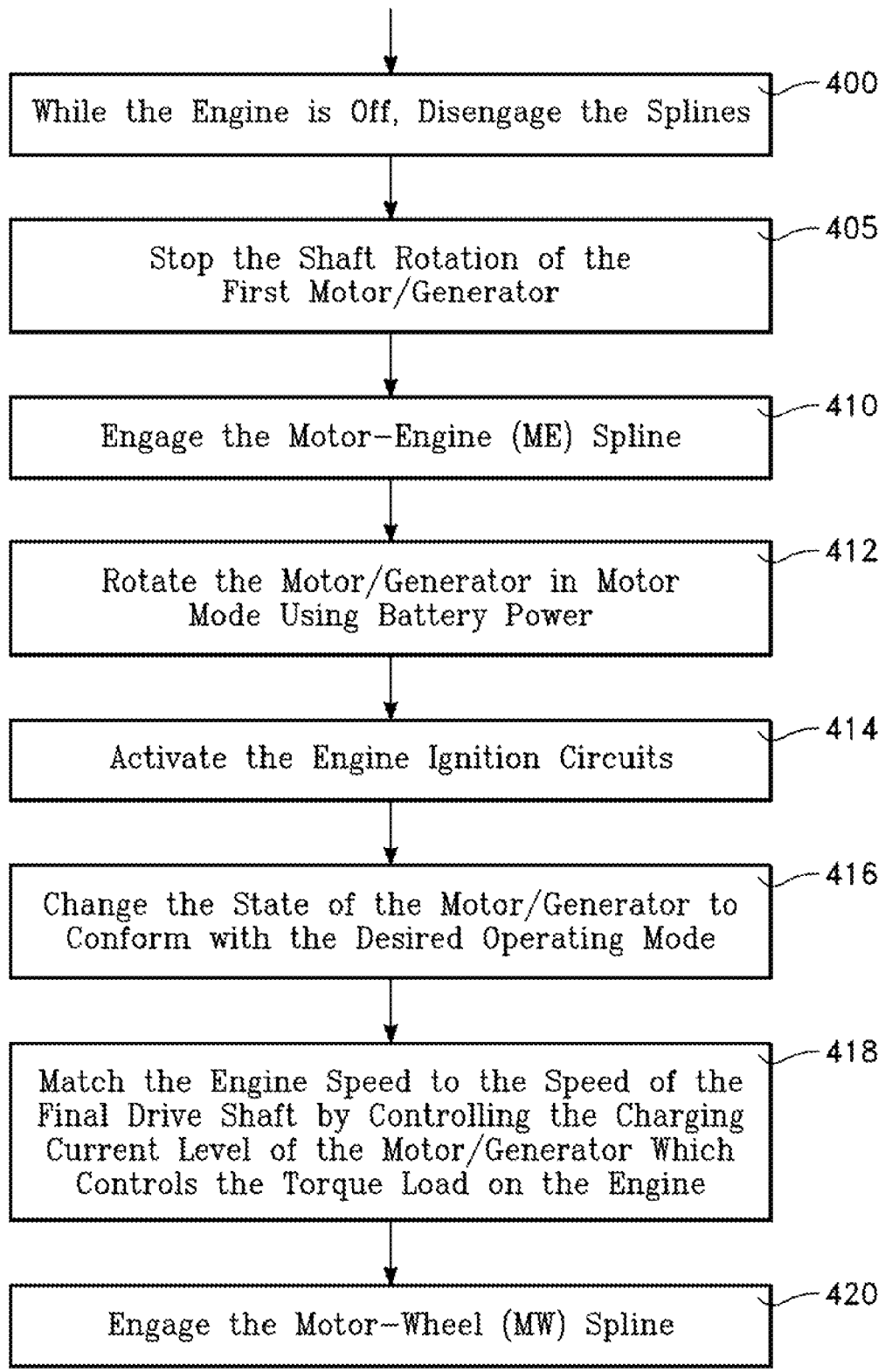
FIG. 9 is a block flow diagram depicting the manner in which the engine is started and then smoothly coupled to the wheels without interrupting vehicle motion.

In FIG. 7, some transitions may be made between an operating mode in which the combustion engine 14 is off and another mode in which the combustion engine 14 is running. FIG. 9 is a block flow diagram depicting how such a transition is made by the master controller 30. First, while the engine is still off, the spline couplers 16, 18 are disengaged (block 400 of FIG. 9), and the shaft velocity of the first motor-generator 12 is brought to zero (block 405 of FIG. 9). Then, the motor-engine spline coupler 16 is engaged (block 410) and the motor-generator 12 is rotated in motor mode using battery power (block 412), while the ignition circuits of the engine 14 are activated, causing the engine 14 to start (block 414). As soon as the engine 14 has started, the state of the motor-generator 12 is changed to conform with the desired operating mode (block 416). For example, for the "high speed low battery" operating mode, the state of the first motor-generator 12 is changed, after the engine 14 starts, from "motor" mode to "generator" mode. Then, the speed of the engine shaft 10-2 is matched to the speed of the drive shaft 10a by the controller 56, under control of the master controller 30, controlling the current controlling element 60 of the motor-generator 12 so as to control the torque load on the engine 14 (block 418). In order to bring the speed of the engine shaft 10-2 close to the speed of the drive shaft 10-4, the master controller 30 monitors the difference between the motor shaft speed and the drive shaft speed and changes the charging current of the motor-generator 12 so as to reduce the difference until the two shaft speeds match. Once the engine shaft speed matches that of the drive shaft 10a, the motor-wheel spline coupler 18 is engaged, coupling the engine 14 to the wheels 24 in a smooth manner (block 420).

Referring to FIG. 1, the master controller 30 carries out this speed matching function by comparing the drive shaft speed (sensed by the sensors 52) with the speed of the motor shaft 10-1 (sensed by the sensor 100 on the motor shaft 10-1). The difference sensed by the master controller 30 is transformed to a command signal. The master controller 30 applies the command signal to the motor-generator controller 56. The motor-generator controller 56 changes the amount of charging current produced by the motor-generator 12 in accordance with the command signal, so as to adjust the torque load imposed on the engine 14 by the motor-generator 12, and bring its shaft speed closer to that of the drive shaft 10-4. The adjustment is made in accordance with the sign of the difference (determining whether the current should be increased or decreased). The magnitude of the adjustment to the charging current may be a predetermined increment or may be an amount proportional to the magnitude of the difference. This adjustment is carried out repetitively until the two shafts rotate at the same speed and the motor-wheel spline coupler 18 can be engaged. Generator loading of the engine is then employed as described above to constantly match the vehicle speed to a desired speed signaled by the accelerator pedal position.

The embodiment of FIG. 4 may be expanded to provide a fourth motor-generator (not shown). In this case, each of the four motor-generators may be adapted to independently drive a different one of the four wheels of the vehicle, for four-wheel drive.

For heavy load applications involving continuous high torque loads over several hours, a second combustion engine (not shown) may be provided which may be decoupled and inactive until activated and coupled to the wheels during sustained high torque operation to supplement the torque provided by the first combustion engine 14.

While the foregoing is directed to embodiments of the present invention, other and further embodiments of the invention may be devised without departing from the basic scope thereof, and the scope thereof is determined by the claims that follow.

What is claimed is:

1. A hybrid vehicle comprising:
   vehicle wheels, first and second motor-generators, a combustion engine and an energy storage device;
   a first coupler between said first motor generator and said engine and a second coupler between said first motor-generator and one of said vehicle wheels, and a coupling between said second motor-generator and said one or another one of said vehicle wheels;
   a driver-operated pedal and a comparator for sensing a position of said pedal;
   a master controller responsive to said position of said pedal and comprising a command signal output;
   a current controller coupled between said energy storage device and one of said electric motor-generators, said current controller comprising a current control signal input;
   a signal path between said command signal output and said current control signal input;
   wherein said first and second couplers are engagable and disengagable under control of said master controller, and wherein said vehicle is configurable into:
   (A) a low speed configuration in which: (a) one of said motor generators is coupled to said wheels and is connected to receive current from at least one of said energy storage device or the other of said motor generators, and (b) the other one of said motor generators is coupled to be driven by said engine and is connected provide current to said energy storage device or to the one motor generator; and
   (B) a high speed configuration in which: (a) said engine is coupled to said wheels, (b) a selected one of said motor generators is coupled to said engine, and (c) said selected one motor generator is connected through said current controller to provide current to said energy storage device.

2. The hybrid vehicle of claim 1 further comprising a vehicle speed sensor comprising a speed signal output coupled to said vehicle controller.

3. The hybrid vehicle of claim 2 wherein said controller is programmed to configure said vehicle into said low speed configuration upon said speed output signal corresponding to a vehicle speed below a predetermined threshold and to configure said vehicle into said high speed configuration upon said speed output signal corresponding to a vehicle speed above a predetermined threshold.

4. The hybrid vehicle of claim 1 wherein each one of said first and second couplers comprises a disengagable spline coupler.

5. The hybrid vehicle of claim 1 wherein said coupling is between said second motor generator and said one of said vehicle wheels, and wherein said second motor generator is coupled between said one of said vehicle wheels and said second coupler.

6. The hybrid vehicle of claim 1 wherein each of said first and second couplers is disengagable under control of said master controller.

* * * * *